(12) United States Patent
Liu et al.

(10) Patent No.: US 6,934,257 B2
(45) Date of Patent: Aug. 23, 2005

(54) TRANSFERRING TRANSMISSION CONTROL PROTOCOL PACKETS

(75) Inventors: Changwen Liu, Portland, OR (US); Prakash N. Iyer, Beaverton, OR (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 09/826,558

(22) Filed: Apr. 4, 2001

(65) Prior Publication Data

US 2002/0146016 A1 Oct. 10, 2002

(51) Int. Cl.[7] .............................................. H04L 12/26
(52) U.S. Cl. ..................... 370/236; 370/392; 370/401
(58) Field of Search ................................. 370/235, 236, 370/392, 401, 412

(56) References Cited

U.S. PATENT DOCUMENTS 6,687,227 B1 * 2/2004 Li et al. ..................... 370/231
2003/0055980 A1 * 3/2003 Liu et al. ..................... 709/227
2004/0030790 A1 * 2/2004 Le et al. ..................... 709/230
2004/0052265 A1 * 3/2004 Mondal ..................... 370/402
2004/0109443 A1 * 6/2004 Gai et al. ..................... 370/389

OTHER PUBLICATIONS

M. Mathis et al., "TCP Selective Acknowledgement Options". Network Working Group Request for Comments: 2018, Oct. 1996, http://www.ietf.org/rfc/rfc2018.txt?number=2018, accessed on Jan. 10, 2001, pp. 1–10.

* cited by examiner

Primary Examiner—Melvin Marcelo
(74) Attorney, Agent, or Firm—Fish & Richardson P.C.

(57) ABSTRACT

Transmitting Transmission Control Protocol (TCP) packets includes transmitting packets over a network path from a source to a destination using TCP in which receipt of at least some of the packets from the source at a destination is acknowledged by the destination to the source, the transmitting including a retransmission of the packets within a subpath of the network path, and managing acknowledgments of the retransmission of the packets within the subpath by a mechanism that is independent of the acknowledging by the source to the destination with respect to the transmitting of the packets over the network path.

29 Claims, 9 Drawing Sheets

TRANSFERRING TRANSMISSION CONTROL PROTOCOL PACKETS

BACKGROUND

This invention relates to transferring Transmission Control Protocol packets.

Transmission Control Protocol (TCP) enables two nodes to establish a reliable connection and exchange streams of information over a network. Each stream of information may be split into TCP segments ("segments") at a transport layer that are each sent across the network as separate Internet Protocol (IP) packets ("packets" or "datagrams") at a network layer. When sent from a source to a destination, a segment includes a sequence number and an acknowledgment number. The sequence number indicates a byte number for the first byte of information in the segment. The acknowledgment number indicates a byte number for the first byte of the next segment that the destination expects to receive from the source. The destination can use the sequence number associated with each segment to assemble the segments in the proper order.

When the destination receives a segment, it sends an acknowledgment to the source indicating the byte of the last segment that it has received and contiguously assembled in the stream. This acknowledgment indicates to the source that the destination has received all bytes up to and including the acknowledgment number minus one. The destination may also (or instead) send an acknowledgment of a non-contiguous segment through a mechanism such as Selective Acknowledgment (SACK).

If the source does not receive an acknowledgment for a sent segment within a certain amount of time or receives multiple duplicate acknowledgements, the source may assume that the segment has been lost in transmission to the destination and resend the segment. This certain amount of time can dynamically change, increasing (via an exponential backoff algorithm) with each lost segment to effectively allow more time for a subsequently sent segment to reach the destination and for the destination to acknowledge receipt of the subsequently sent segment.

DESCRIPTION

Figure 1:
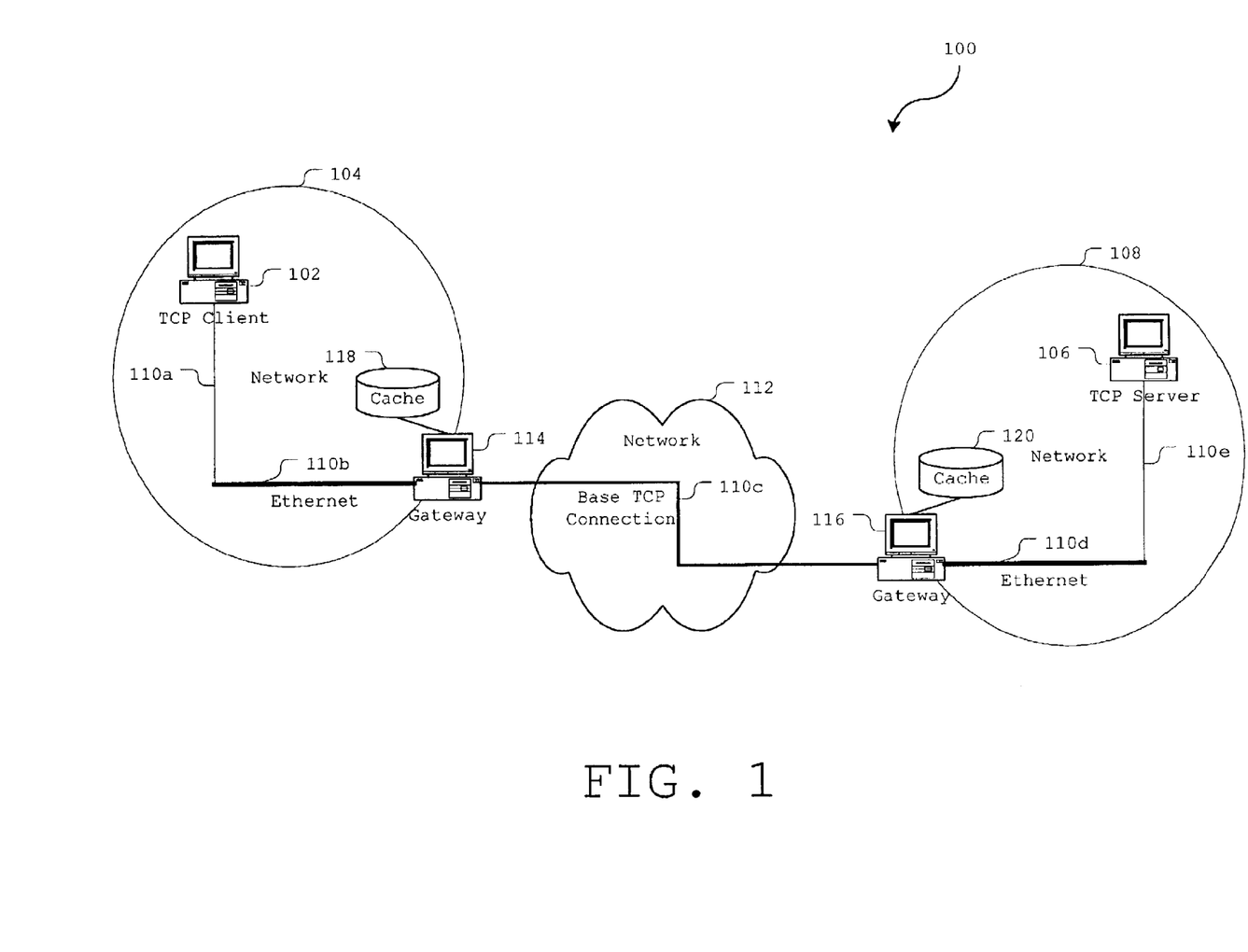
FIG. 1 shows a simplified network configuration.

Referring to a simplified network configuration 100 shown in FIG. 1, a client 102 included in a first network 104 and a server 106 included in a second network 108 can communicate with each other across communication links 110a–110e. The communication link 110c includes a TCP tunnel, which is a TCP based connection, also referred to as a base TCP connection. TCP tunnels are typically used when a packet traverses through two gateway devices, e.g., a first gateway device 114 and a second gateway device 116, between its original source and ultimate destination.

When a packet is in a TCP tunnel, both the packet's header and payload are usually encrypted and compressed for bandwidth efficiency, although tunneling does not necessarily imply encryption. A TCP packet's traversal through the TCP tunnel is referred to as TCP-in-TCP tunneling. The TCP connection whose packets traverse through the TCP tunnel is referred to as the upper layer TCP, and the TCP layer that functions as the tunnel is referred to as base TCP in this draft.

In this example network configuration 100, upper layer TCP packets on the client side traverse through client-side communication links 110a and 110b and on the server side through server-side communication links 110d and 110e. The upper layer TCP packets also go through the communication link 110c, the base TCP connection between the first gateway 114 and the second gateway 116. The communication link 110c runs through a network 112 and connects the first and second gateways 114 and 116, the gateways associated with the first and second networks 104 and 108, respectively. The base layer TCP carries upper level TCP packets over the base TCP connection 110c.

Having two layers of retransmission can negatively impact the performance of TCP-in-TCP tunneling, i.e., in transmitting upper layer TCP packets over the base TCP connection 110c. The upper layer TCP depends on the base TCP connection 110c to transfer packets between the first and second gateways 114 and 116. Packet transfer delays in the base TCP connection 110c due to factors such as packet loss and network congestion can in turn delay the upper layer TCP packet transfer from end to end. When this delay exceeds both the base TCP layer timeout value and the upper layer TCP timeout value, both the base TCP layer and the upper layer TCP would independently retransmit the TCP packets over the base TCP connection 110c. Thus, the upper layer TCP throughput may be greatly reduced or completely halted. Retransmissions may also cause inefficient use of low bandwidth, expensive links, as are common in wireless packet data networks.

The end-to-end retransmission of upper layer TCP packets due to loss in the client-side communication links 110a and 110b and the server-side communication links 110d and 110e also can negatively impact upper layer TCP performance, i.e., if an upper layer TCP data packet is lost in the client-side communication links 110a and 110b or the server-side communication links 110d and 110e, the upper layer TCP will retransmit the segment from the client 102 to the server 106 or from the server 106 to the client 102.

However, by caching the packets at the first and the second gateways 114 and 116 and exchanging acknowledgments for received packets with each other at the base TCP layer (e.g., the "session layer" in the Open System Interconnection (OSI) model), the first and second gateways 114 and 116 can reduce the two layers of retransmissions to just one layer and reduce end-to-end packet retransmission across the entire upper layer TCP path to just packet retransmission across part of the path, either the client-side communication links 110a and 110b or the server-side communication links 110d and 110e.

The first and second gateways 114 and 116 may each maintain (or otherwise have access to) a cache at the session layer. Assume that in this example network configuration 100, the first gateway 114 maintains a first cache 118 and the second gateway 116 maintains a second cache 120. The first and second caches 118 and 120 may each include counters and/or queues for tracking the transmission of packets and acknowledgements (ACKs) to and receipt of packets and acknowledgements from the gateway 114 or 116 at the opposite end of the base TCP connection 110c.

Figure 2:
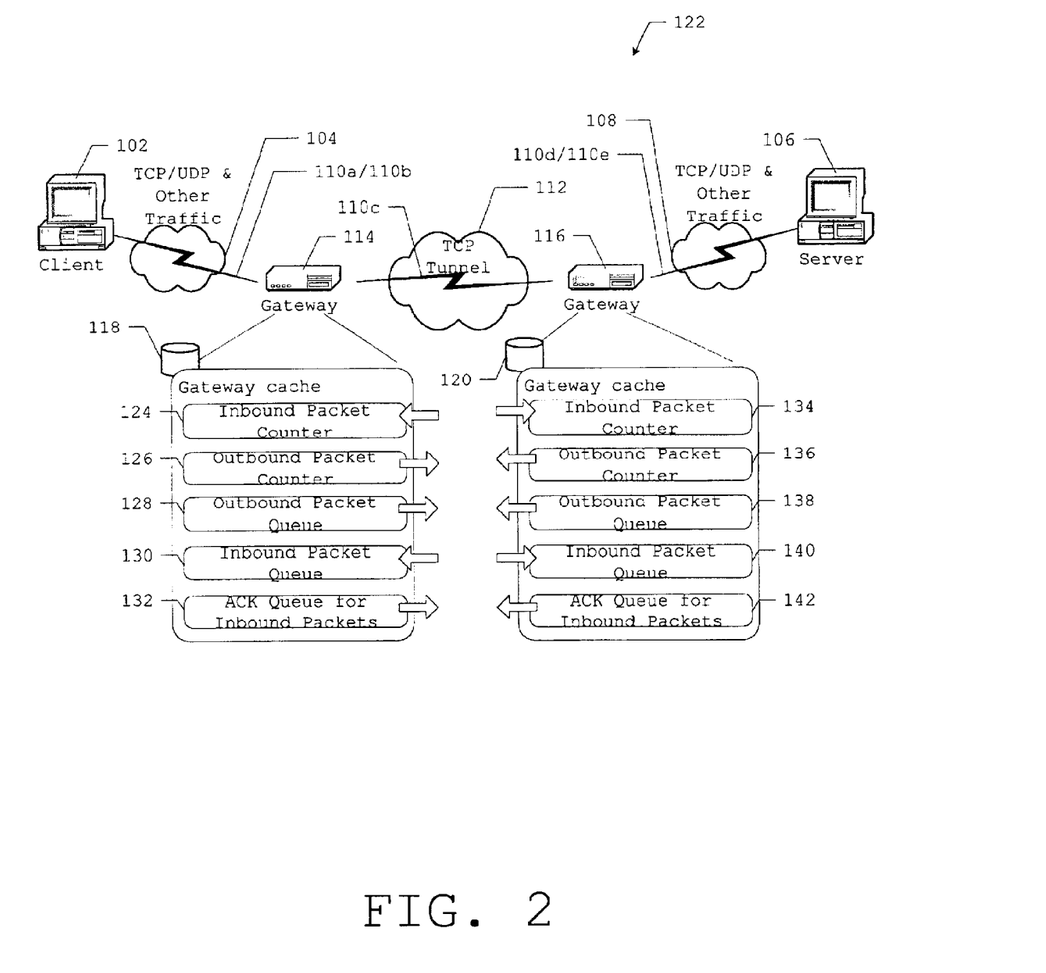
FIG. 2 shows another simplified network configuration.

FIG. 2 illustrates an example setup 122 of the first and second caches 118 and 120. In the example setup 122, the first cache 118 includes an inbound packet counter 124, an outbound packet counter 126, an outbound packet queue 128, an inbound packet queue 130, and an ACK queue 132 for inbound packets. Each of these elements is described in turn.

The inbound packet counter 124 can keep track of an amount of packets sent by the second gateway 116 and received by the first gateway 114.

The first gateway 114 can use the outbound packet counter 126 to keep track of an amount of packets transmitted by the first gateway 114 to the second gateway 116.

The outbound packet queue 128 can maintain copies of (or pointers to) packets transmitted by the first gateway 114 to the second gateway 116 that have not been acknowledged by the second gateway 116. Once a particular packet included in the outbound packet queue 128 is acknowledged, the packet can be removed from the outbound packet queue 128. A new upper layer TCP packet from the client 102 that arrives at the first gateway 114 can be stored in the outbound packet queue 128 and be sent from the first gateway 114 to the second gateway 116 only when all packets currently in the outbound packet queue 128 contain different segments from the segment contained in this TCP packet. In other words, the outbound packet queue 128 includes no duplicate segments.

The inbound packet queue 130 is where the first gateway 114 stores copies of received packets (or pointers to the packets) from the second gateway 116 that are transmitted to the client 102 but have not been acknowledged by the client 102. When (or if) the client 102 acknowledges receipt of a packet (e.g., by sending an ACK at the upper layer TCP), the first gateway 114 removes the acknowledged packets from the inbound packet queue 130.

The ACK queue 132 stores ACKs sent by the client 102 to acknowledge receipt of packets sent from the server 106 at the upper layer TCP.

The second cache 120 also includes an inbound packet counter 134, an outbound packet counter 136, an outbound packet queue 138, an inbound packet queue 140, and an ACK queue 142 that function similar to like-named elements included in the first cache 118.

With the two caches 118 and 120, packet retransmissions can be reduced from two layers of retransmission (the upper layer TCP and the base TCP layer) to one layer of retransmission (the base TCP layer), and no changes are needed for the upper layer TCP. Furthermore, if a packet gets lost in transit from the first gateway 114 to the client 102 (or from the second gateway 116 to the server 106), the first gateway 114 (or the second gateway 116), upon proper detection, can retransmit the packet to the client 102 (or the server 106) from the inbound packet queue 130 (or the inbound packet queue 140). Therefore, the recovery of lost TCP packets can be hidden from the sender (the server 106 or the client 102, depending on traffic flow) and recovery time can be reduced, thereby improving the performance of upper layer TCP applications.

The elements in FIGS. 1 and 2 can be implemented in a variety of ways. The first gateway 114 and the second gateway 116 are not limited to communicating with each other across the base communication link 110c using the TCP protocol. Any reliable protocol such as TCP, modified forms of TCP, reliable User Datagram Protocol (UDP), reliable layer two links, and other similar protocols can be used in the network configuration 100 and adapted to the described examples. Reliability in this context generally refers to error detection, flow control, and packet recovery.

The packets communicated between the client 102 and the server 106 can include data, instructions, or a combination of the two. Each sent packet may be part of a packet stream, where each of the packets in the packet stream fits together to form a contiguous stream of data.

Figure 3:
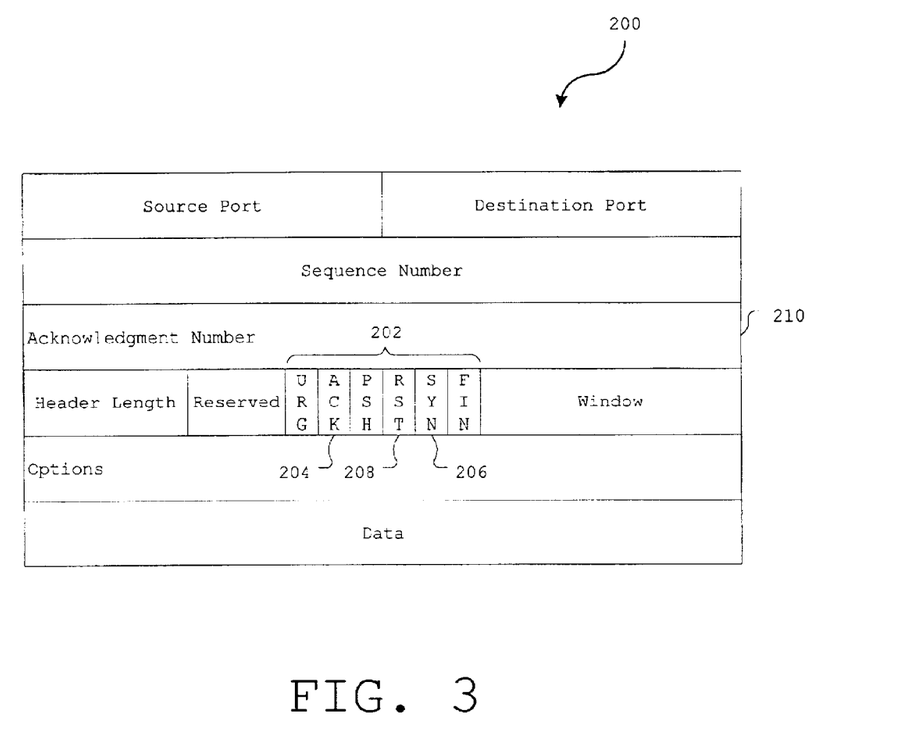
FIG. 3 is a block diagram of a TCP segment.

FIG. 3 shows an example of a packet 200 that may be sent between the client 102 and the server 106. The packet 200 includes a group 202 of bits that indicates various states that may be present in the TCP protocol. Three of the bits, an ACK bit 204, a SYN bit 206, and an RST bit 208 are discussed further below. Generally, the ACK bit 204 indicates whether an acknowledgment number 210 is valid, the SYN bit 206 establishes initial agreement on sequence numbers, and the RST bit 208 indicates whether the connection between the client/server pair should be reset.

The network 112 can include any kind and any combination of networks such as an Internet, a local network, a private network, a public network, or other similar network. Communications through the network 112 may be secured with a mechanism such as Transport Layer Security/Secure Socket Layer (TLS/SSL), wireless TLS (WTLS), or secure Hypertext Transfer Protocol (S-HTTP). The first and second networks 104 and 108 can include any portion of a network that shares an independent, interconnected segment or domain such as a local area network (LAN) having a common address prefix or other similar network.

The client 102 and the server 106 can each include any device capable of communicating with each other through the network 112 and the first and second gateways 114 and 116 such as a server, a mobile computer, a stationary computer, a telephone, a pager, a personal digital assistant, or other similar device.

The caches 118 and 120 can each include a storage mechanism such as a data queue, a buffer, a local or remote memory device, or other similar mechanism.

The communication links 110a–110e can include any kind and any combination of communication links such as modem links, Ethernet links, cables, point-to-point links, infrared connections, fiber optic links, cellular links, Bluetooth, satellite links, and other similar links.

The first and second gateways 114 and 116 can each include any device or mechanism capable of communicating with the network 112 and its associated client 102 or server 106 such as a computer, proxy server, a virtual private network gateway, a Realm Specific Internet Protocol (RSIP) gateway, or other similar device. In another network configuration, the client 102 may act as the gateway by, for example, running gateway software. In such a case, the client 102 may be a wireless or mobile device running gateway software so that rather than going through the first gateway 114 in the first network 104 en route to the network 112 and eventually to the second gateway 116 in the second network 108 (perhaps the client's home network) and the server 106, the client 102 may go through a Network Address Translation/firewall.

Furthermore, the network configuration 100 and the example setup 122 are simplified for ease of explanation. The network configurations 100 and 122 may include more or fewer elements such as networks, communication links, proxy servers, firewalls, or other security mechanisms, Internet Service Providers (ISPs), and other elements.

Figure 4:
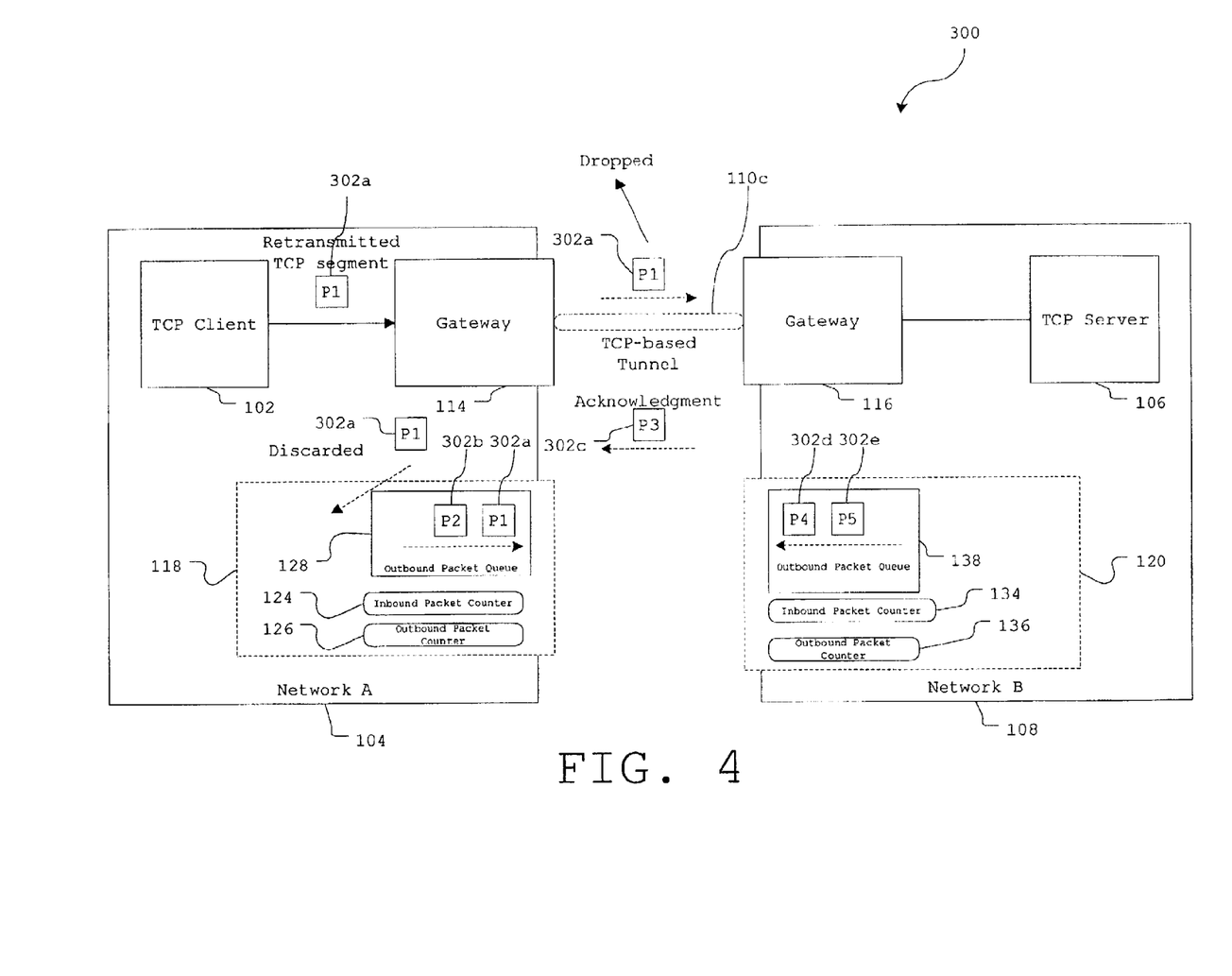
FIG. 4 shows an example of packet transmission between two networks.

Referring to FIG. 4, a second simplified network configuration 300 shows the base TCP connection 110c as a TCP tunnel. As mentioned above, the base TCP connection 110c maintains two caches 118 and 120, one at each of the gateways 114 and 116. The base TCP connection 110c tries to transfer upper layer TCP packets (e.g., packets 302a–302e) from the cache of one gateway to the other gateway and to send session layer acknowledgments or ACKs from the receiving gateway to the sending gateway. In this example, assume that the first gateway 114 is the sending gateway and that the second gateway 116 is the receiving gateway.

The session layer acknowledgments may be sent periodically, sent for each received packet, or sent in another, similar way. Each session layer acknowledgment identifies packets that have been successfully transferred over the base TCP connection 110c from the first gateway 114 to the second gateway 116, e.g., by including information such as a total amount of IP or TCP packet bytes received thus far by the second gateway 116 at, for example, the inbound packet counter 134. The first gateway 114 can then update its session layer cache by removing acknowledged packets from the first cache 118.

Figure 5:
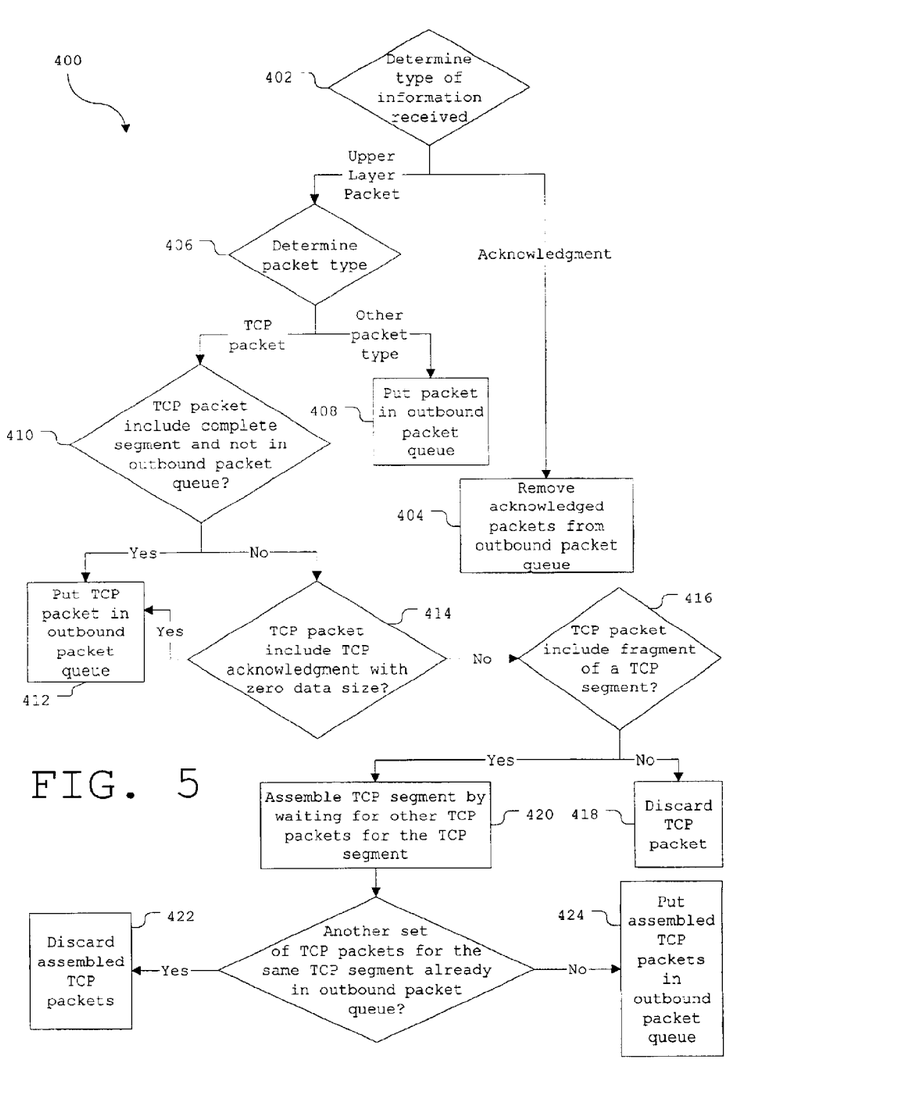
FIG. 5 is a flowchart showing a sender-side process of transmitting a packet.

Referring to FIG. 5, a base TCP process 400 illustrates from the sending gateway's perspective how the base TCP connection 110c may handle a received piece of information, using the second network configuration 300 of FIG. 4 as an example. When a piece of information travels arrives at the sending gateway, the first gateway 114 in this example, the first gateway 114 determines 402 its type.

If the piece of information is a session layer acknowledgment from the receiving gateway, the second gateway 116 in this example, the first gateway 114 removes 404 the acknowledged packets from its session layer cache 118 (from the outbound packet queue 128). Transport layer acknowledgments may be sent in both directions, but the session layer acknowledgments can piggyback the transport layer acknowledgments so the overhead of session layer acknowledgements can be minimized, and the rate of session layer acknowledgments can be configurable.

If, instead of a session layer acknowledgment, the piece of information received by the first gateway 114 is an upper layer TCP packet from the client 102, then the first gateway 114 checks 406 the packet's type. If the packet is an IP packet (excluding a TCP packet), then the first gateway 114 stores 408 the packet directly in the first cache 118 (in the outbound packet queue 128). This queues the packet for transmission from the first gateway 114 to the second gateway 116.

If the packet is a TCP packet from the client 102, then the first gateway 114 determines 410 whether the TCP packet includes a complete TCP segment and is not in the outbound packet queue 128 in the first cache 118. If the TCP packet includes a complete TCP segment that is not included in any TCP packets included in the outbound packet queue 128, then the first gateway 114 stores 412 the TCP packet in the outbound packet queue 128, queuing the TCP packet for transmission to the second gateway 116.

If the TCP packet does not include a complete TCP segment or other packets in the outbound packet queue 128 already include the same segment, then the first gateway 114 determines 414 whether the TCP packet includes a TCP acknowledgment with zero data size. If the TCP packet includes a TCP acknowledgment with zero data size, then the first gateway 114 stores 412 the TCP packet in the first cache 118, queuing the TCP packet for transmission to the second gateway 116.

If the TCP packet does not include a TCP acknowledgment with zero data size, then the first gateway 114 determines 416 if the TCP packet includes a fragment of a TCP segment. If not, then the first gateway 114 discards 418 the TCP packet. This discarding reflects the fact that the TCP packet is already included in the outbound packet queue 128.

If the TCP packet does include a fragment of a TCP segment, then the first gateway 114 assembles 420 the TCP segment by waiting for other TCP packets included in the same TCP segment from the client 102. Assembling the TCP segment requires calculations by the first gateway 114 (as does checking the TCP packet type), but these calculations should have little impact on performance because multiplexing/demultiplexing operations for IP packets already exist in TCP-in-TCP tunneling, because communication delay is mostly due to network bandwidth and not router calculation, and because fragmented TCP packets should rarely occur.

If one or more assembled TCP packets for the same TCP segment are already in the outbound packet queue 128, then the first gateway 114 discards 422 the assembled TCP packets. The first gateway 114 may drop the assembled TCP packets because they are redundant of packets already in the outbound packet queue 128.

If one or more assembled TCP packets for the same TCP segment are not already in the outbound packet queue 128, then the first gateway 114 stores 424 the assembled TCP packets in the first cache 118 (in the outbound packet queue 128). This segment assembly may introduce some delays for TCP segments. However, this assembly may discover dropped packets relatively early, thereby preventing transmission of incomplete TCP segments over the base TCP connection 110c, which can save bandwidth.

The base TCP connection 110c is a relatively reliable transport link. Upper layer TCP packets are less likely to get lost in the base TCP connection 110c than in the upper layer TCP connections between the first gateway 114 and the client 102 in the first network 104 and between the second gateway 116 and the server 106 in the second network 108. If an upper layer TCP packet gets lost in one of these two upper layer TCP connections, a recovery process tries to recover the lost packet. Examples of the recovery process include congestion control algorithms such as a slow start algorithm, a congestion avoidance algorithm, a fast transmit algorithm, and a fast recovery algorithm and other, similar algorithms. Such recovery processes typically need to retransmit lost TCP packets across the entire upper layer TCP from sender to receiver (i.e., between the client 102 and the server 106). However, by caching packets at the first and the second gateways 114 and 116, packets only need to be retransmitted on part of the upper layer TCP.

Therefore, in the base TCP process 400, the first and second caches 118 and 120 can queue two types of TCP packets: packets received from the other gateway and stored in the appropriate inbound packet queue 130 or 140, and acknowledgements from upper TCP layer sender, received and stored in the appropriate ACK queue 132 or 142.

Figure 6:
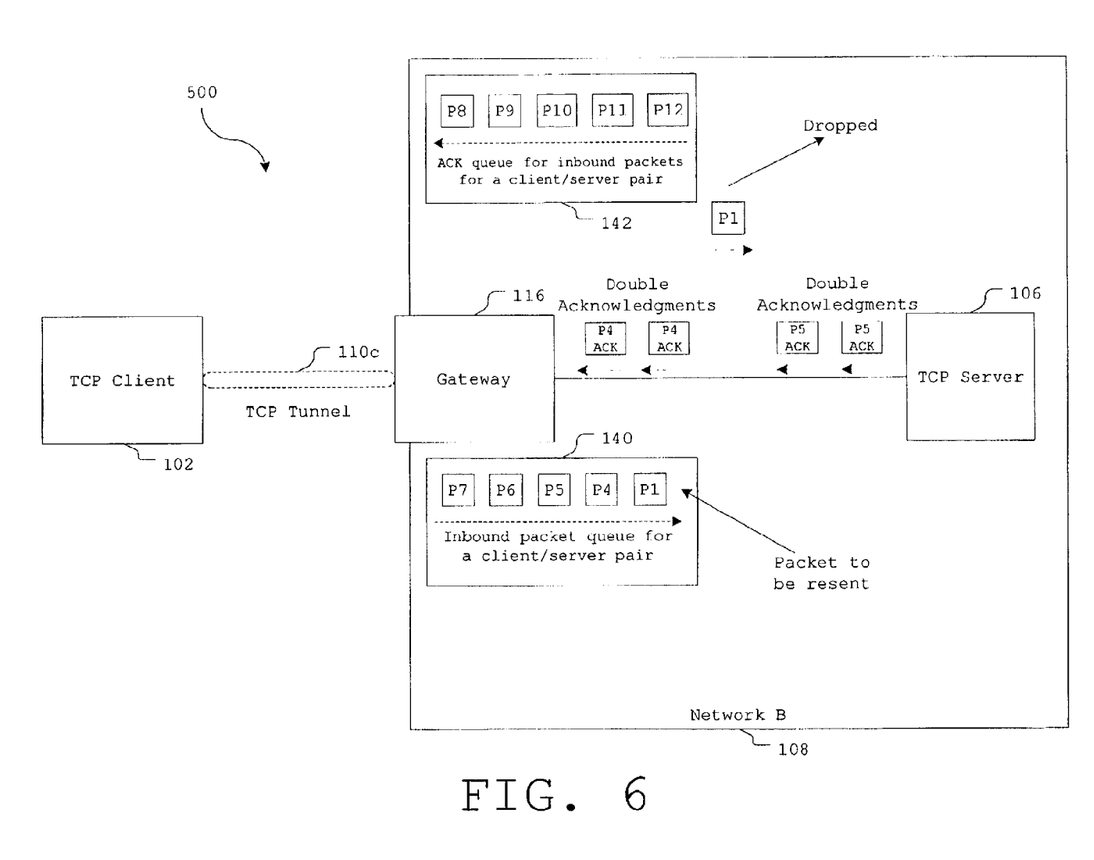
FIG. 6 shows an example of packet transmission between two networks.

Referring to FIG. 6, a third simplified network configuration 500 shows the inbound packet queue 140 and the ACK queue 142 at the second gateway 116 in the second cache 120 for each upper layer TCP client and server pair that does not support or enable a SACK option (or similar acknowledgment mechanism) from server to client.

Examples of upper layer TCP connections that may not use a SACK option (or a similar mechanism) include legacy client applications or applications in platforms that do not support or enable SACK (or other similar mechanism). The two queues 140 and 142 can vary in size from each other and from other similar queues included at the second gateway 116. Depending on total memory available in the second gateway 116, the inbound packet queue 140 holds a certain number or amount of tunneled TCP packets received from the first gateway 114 and sent to the server 106. For example, the inbound packet queue 140 may be capable of holding an amount of packets equal to a receiving buffer size advertised by the server 106. The ACK queue 142 holds a certain number or amount of ACKs recently received from the server 106. Furthermore, the sizes of both of the two queues 140 and 142 are configurable.

The first gateway 114 maintains two queues 130 and 132 similar to the inbound packet queue 140 and the ACK queue 142 for inbound packets. It is assumed for simplicity in this example that the only such client/server pair involving the first and second networks 104 and 108 is the pair including the client 102 and the server 106.

Figure 7:
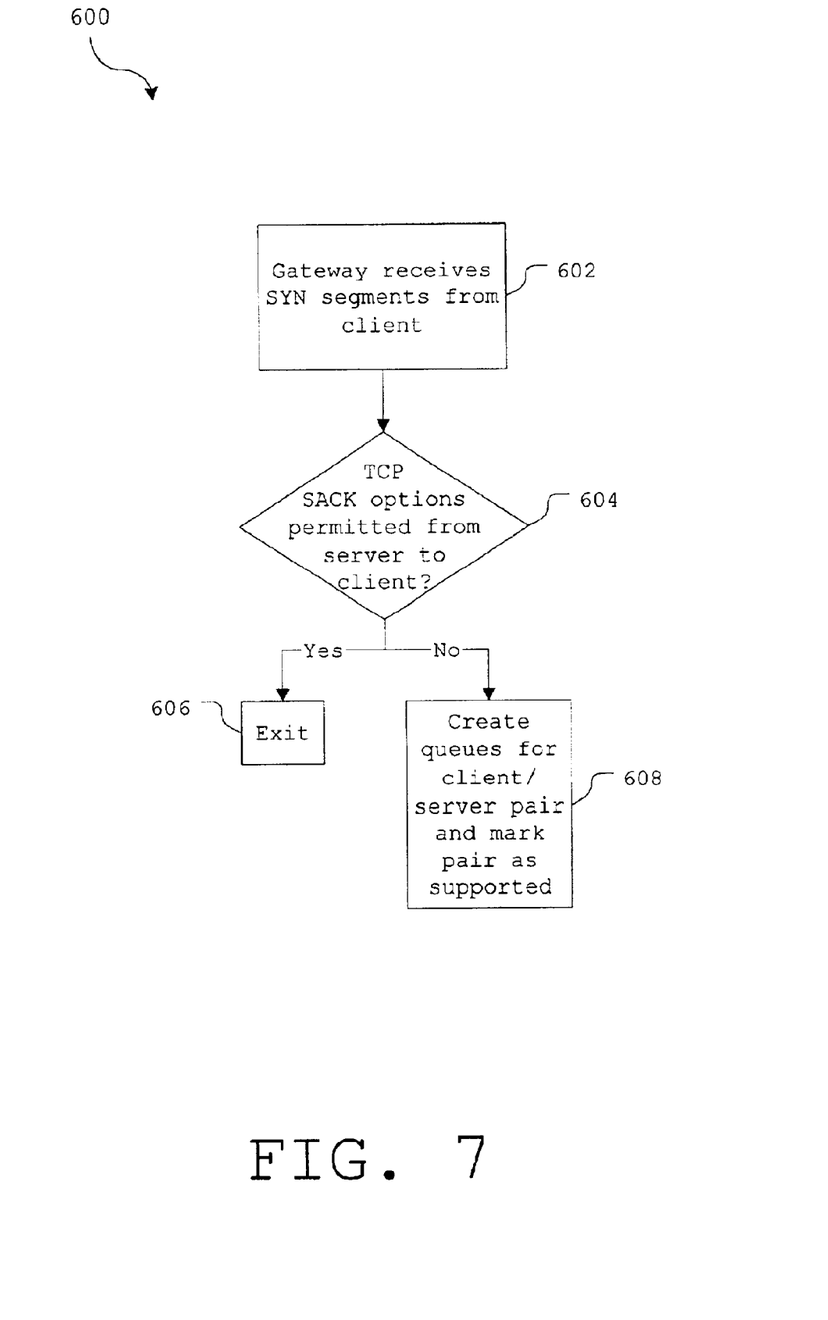
FIG. 7 is a flowchart of a cache setup process.

Referring to FIG. 7, a queue setup process 600 illustrates an example of how in the third network configuration 500 (see FIG. 6) the two queues 140 and 142 can be added to the second cache 120 in the second network 108. The queue setup process 600 is described with relation to the second network 108, but a similar process can be used to set up similar queues in the first network 104.

Generally, the base TCP connection 110c determines in the queue setup process 600 if the client 102 can permit the server 106 to acknowledge receipt of non-contiguous packets using SACK or other similar mechanism. If the client 102 does so permit the server 106, then the second gateway 116 need not setup the queues 140 and 142. If, however, the client 102 does not permit the server 106 to acknowledge all successfully received packets but can only acknowledge successfully received contiguous packets by the server 106, the base TCP connection 110c sets up the queues 140 and 142. In this way, the queues 140 and 142 can be used in retransmitting lost TCP packets from the second gateway 116 to the server 106 for the upper layer TCP.

More specifically, in the queue setup process 600, the second gateway 116 receives 602 a TCP packet from the client 102 and determines 604 if TCP SACK option is permitted from the server 106 to the client 102. The second gateway 116 may make this determination upon receiving the SYN TCP packet from the client 102. The second gateway 116 may detect if the client/server pair permits mechanisms other than or in addition to SACK that may be used in acknowledging successful receipt of packets. Assume in this example that the second gateway 116 checks only for SACK enablement.

Typically, the second gateway 116 may determine if SACK is permissible by determining whether a SACK-permitted option was sent from the client 102 to the server 106 during upper layer TCP setup. The availability of SACK is indicated with a SACK-permitted option. The SACK-permitted option may be included in a SYN segment sent by the client 102 to the server 106. In the case of a SYN segment, the SYN segment includes a SACK-permitted option that indicates that the SACK option is permissible from receiver to sender once a connection is opened between the sender and the receiver, which here are the client 102 and the server 106, respectively. Calculations checking the SYN segments should have little impact on performance because multiplexing/demultiplexing operations for IP packets already exists in TCP-in-TCP tunneling and because communication delay is mostly due to network bandwidth and not router calculation.

If TCP SACK is permitted from the server 106 to the client 102, then the second gateway 116 exits 606 the cache setup process 600 without setting up the queues 140 and 142.

If, on the other hand, SACK is not permitted from the server 106 to the client 102, then the second gateway 116 creates 608 the queues 140 and 142 for the client/server pair including the client 102 and the server 106 and marks the client/server pair as supported. Creating the queues 140 and 142 includes initializing the storage mechanism being used for the queues 140 and 142, such as allocating or reserving memory space at the second gateway 116. Because the amount of memory space can vary as described above, the second gateway 116 may also determine the appropriate size of each of the queues 140 and 142.

Marking the client/server pair as supported includes recording for future reference that communications between the client 102 and the server 106 are subject to the processing described below with reference to FIGS. 8A–8B. The marking can also signal the second gateway 116 to not check subsequently received segments from the client 102 for SACK permissibility.

Figure 8A:
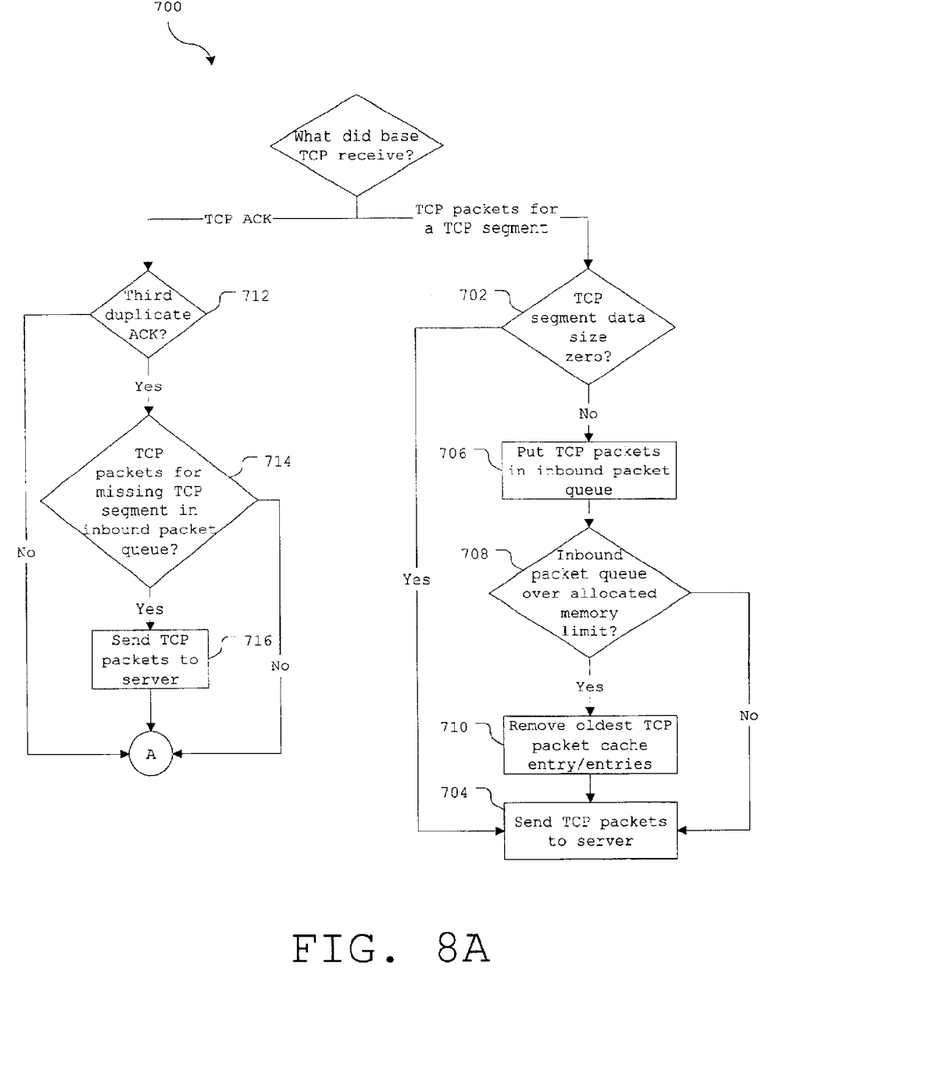
FIGS. 8A–8B are flowcharts showing a process of packet caching.
Figure 8B:
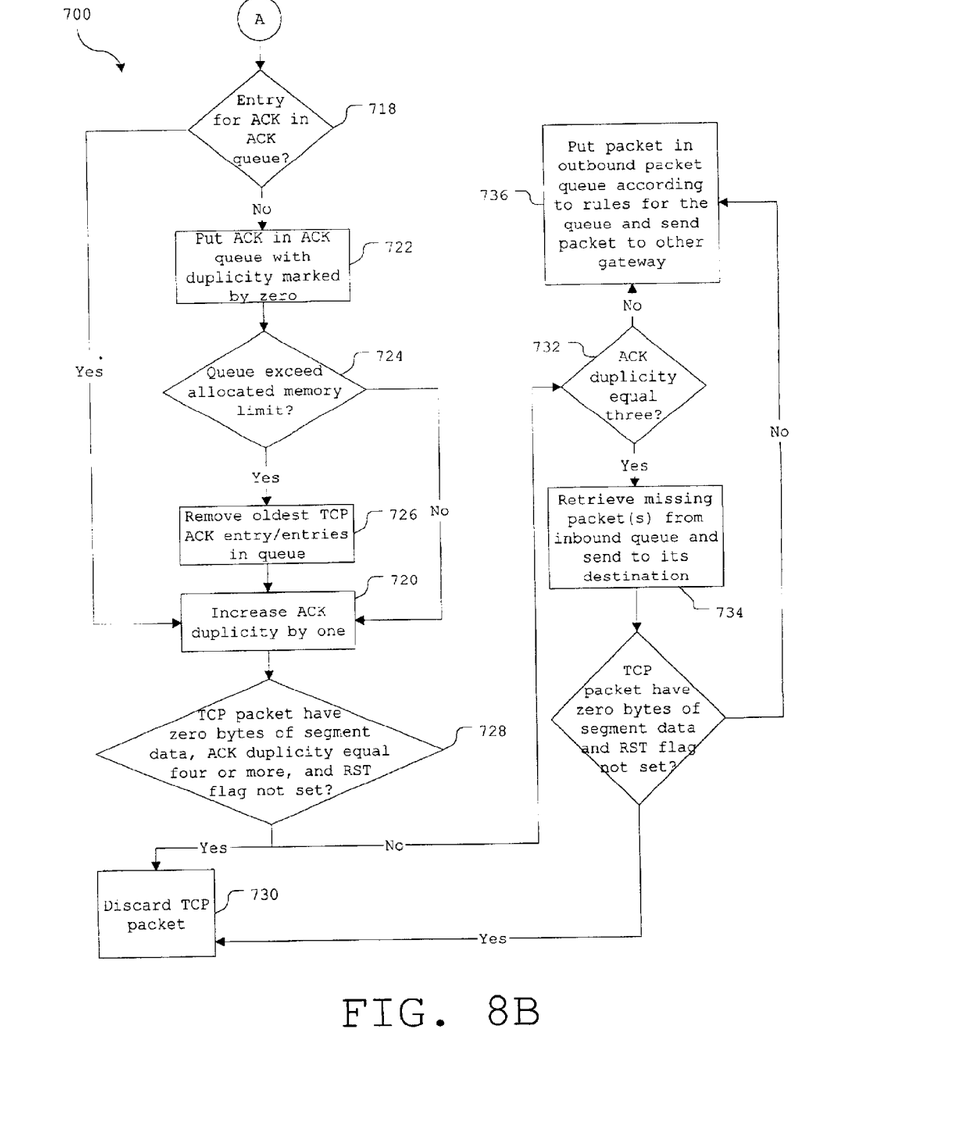

Referring to FIGS. 8A–8B, another process 700 illustrates an example of how packets may be transmitted to and from the queues 140 and 142. The second gateway 116 processes different kinds of TCP information that it receives in different ways.

Referring first to FIG. 8A, if the second gateway 116 receives upper layer TCP packets for a TCP segment from the first gateway 114, then the second gateway 116 determines 702 whether the TCP segment data sizes in the TCP packets are zero. If the TCP data segment sizes are zero, then the gateway 116 sends 704 the TCP packets to the server 106, their destination.

If the TCP data segment sizes are not zero, then the second gateway 116 puts 706 the TCP packets in the inbound packet queue 140. The second gateway 116 also determines 708 if the inbound packet queue 140 is over its allocated size, e.g., is over its preallocated memory limit. This determination may be made before or after putting the TCP packets in the inbound packet queue 140. If the inbound packet queue 140 is not over its allocated size, then the second gateway 116 sends 704 the TCP packets to the server 106. If the inbound packet queue 140 is over its allocated size, then the second gateway 116 removes 710 the oldest queue entry or entries from the inbound packet queue 140. The number of entries removed from the inbound packet queue 140 may be a fixed number or the number may vary. If the number varies, the number of entries removed from the inbound packet queue 140 may be the minimum number of entries that can be removed so as to just fit the instant TCP packets in the inbound packet queue 140. After putting the TCP packets in, the TCP packets are sent 704 to the server 106.

The second gateway 116 may receive a TCP ACK from the server 106 included in the supported client/server pairs. The second gateway 116 determines 712 if the TCP ACK is the third duplicate TCP ACK received from the server 106. The second gateway 116 can check for any number duplicate, the third duplicate is only an example.

The second gateway 116 may receive duplicate TCP ACKS as an indication of packet loss, i.e., if the server 106 has received packets out of sequence and a mechanism such as SACK that can acknowledge out of sequence segments is not enabled for the client/server pair. For example, the server 106 may send a first TCP ACK to the second gateway 116 after receiving a first segment in a stream. The server 106 may send the same first TCP ACK twice if the next segment received by the server 106 is a third segment in the stream because a second segment of the stream that fits between the first segment and the third segment has not yet been successfully received by the server 106. Until the server 106 receives the second segment, the duplicated first TCP ACK will be sent to the second gateway 116 each time a packet is received by server 106.

If the TCP ACK received by second gateway 116 from the server 106 is not a third duplicate, then the second gateway 116 continues the process 700 as described below with reference to FIG. 8B. If the TCP ACK is a third duplicate, then the second gateway 116 determines 714 if TCP packets for the missing TCP segment are in the inbound packet queue 140. (As explained above, the missing TCP segment includes a sent but unreceived segment that falls sequentially between segments that have been successfully received by the server 106.) If not, then the second gateway 116 continues the process 700 as described below with reference to FIG. 8B. If TCP packets for the missing segment are in the inbound packet queue 140, then the second gateway 116 sends 716 the TCP packets for the missing segment to the server 106 and continues the process 700 as described below with reference to FIG. 8B.

Referring to FIG. 8B, once the second gateway 116 receives the TCP ACK, the second gateway 116 determines 718 if an entry for the TCP ACK exists in the ACK queue 142. If so, then the second gateway 116 increases 720 the ACK duplicity by one for the TCP ACK already in the ACK queue 142.

If no entry for the TCP ACK exists in the ACK queue 142, then the TCP ACK is the first acknowledgment for a particular TCP packet. The second gateway 116 puts 722 the TCP ACK in the ACK queue 142. The duplicity for the TCP ACK is marked as zero to indicate that it is the first received acknowledgment for this particular TCP packet.

The second gateway 116 also determines 724 if the ACK queue 142 is over its allocated size, e.g., is over its preallocated memory limit. This determination may be made before or after putting the TCP ACK in the ACK queue 142. If the ACK queue 142 is not over its allocated size, then the second gateway 116 increases 720 the ACK duplicity by one for the TCP ACK in the ACK queue 142. The second gateway 116 may put the TCP ACK in the ACK queue 142 marked with a duplicity of one instead of zero, in which case the duplicity for the TCP ACK need not be increased by one at this point. If the ACK queue 142 is over its allocated size, then the second gateway 116 removes 726 the oldest cache entry or entries from the ACK queue 142. The number of entries removed from the ACK queue 142 may be a fixed or a variable number as described above with reference to removing entries from the ACK queue 142. The second gateway 116 also increases 720 the ACK duplicity by one for the TCP ACK in the ACK queue 142.

Whether an entry for the TCP ACK existed in the ACK queue 142 or not, the second gateway 116 determines whether to drop or to send the TCP packet including the TCP ACK. The second gateway 116 checks 728 if the TCP packet has zero bytes of segment data, if the TCP ACK duplicity equals four or more, and if a reset (RST) flag included with the TCP packet is not set.

If all three factors are true (zero bytes of segment data, duplicity over four, and RST flag not set), then the second gateway 116 discards 730 the TCP packet. The TCP packet can be safely dropped because the TCP packet has zero bytes of segment data. Furthermore, the ACK has already been sent at least twice for the proper connection (because the RST flag was not set).

If any one of the three factors is false but the TCP ACK duplicity equals three, then the second gateway 116 determines 732 whether the missing packets are in the inbound packet queue 140. If so, then the second gateway 116 retrieves 734 the packets from the inbound packet queue 140 and sends 732 the packets to the server 106. If the data size of the packet is zero and reset flag is not set, then the second gateway 116 still discards 730 the TCP packet. Otherwise, the second gateway 116 relays the TCP packet to first gateway 114 and puts 736 it in the outbound packet queue 138 according to rules described above.

Note that although when third and later duplicate TCP ACKs for a missing TCP segment have nonzero data size they are still sent back to the client 102 and hence the client 102 may retransmit the TCP segment across the entire link, this scenario rarely occurs. The server 106 usually does not send new packets across the upper layer TCP until it receives all currently expected packets from the client 102, and vice versa. On the other hand, if third and later duplicate ACKs from the server 106 to the client 102 do not include any data (e.g., are ACKs for uploading in a file transmission protocol), then the third and later duplicate ACKs for a lost TCP segment may be hidden from the client 102 and thus reduce or eliminate transmissions of upper layer TCP segments from the client 102 to the server 106 due to the activation of a recovery algorithm in the client 102.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
   transmitting packets over a network path from a source to a destination using Transmission Control Protocol (TCP) in which receipt of at least some of the packets from the source at a destination is acknowledged by the destination to the source, the transmitting including a retransmission of the packets within a subpath of the network path; and managing acknowledgments of the retransmission of the packets within the subpath by a mechanism that is independent of the acknowledging by the destination to the source with respect to the transmitting of the packets over the network path.

2. The method of claim 1 in which the network path includes an upper TCP layer.

3. The method of claim 1 in which the subpath includes a base TCP layer.

4. The method of claim 1 in which the subpath extends between a gateway device and the source.

5. The method of claim 1 in which the subpath extends between a gateway device and the destination.

6. The method of claim 1 in which managing acknowledgments includes storing at the subpath a packet sent by the source to the destination for retransmission until the subpath receives an acknowledgment that the destination has received the packet.

7. The method of claim 1 further comprising transmitting the packets within the subpath.

8. An article comprising:
    a machine-readable medium which contains machine-executable instructions, the instructions causing a machine to:
    transmit packets over a network path from a source to a destination using Transmission Control Protocol (TCP) in which receipt of at least some of the packets from the source at a destination is acknowledged by the destination to the source,
    the transmitting including a retransmission of the packets within a subpath of the network path; and
    manage acknowledgments of the retransmission of the packets within the subpath by a mechanism that is independent of the acknowledging by the destination to the source with respect to the transmitting of the packets over the network path.

9. The article of claim 8 in which the network path includes an upper TCP layer.

10. The article of claim 8 in which the subpath includes a base TCP layer.

11. The article of claim 8 in which the subpath extends between a gateway device and the source.

12. The article of claim 8 in which the subpath extends between a gateway device and the destination.

13. The article of claim 8 in which managing acknowledgments includes storing at the subpath a packet sent by the source to the destination for retransmission until the subpath receives an acknowledgment that the destination has received the packet.

14. An apparatus comprising:
    a source configured to transmit packets over a network path to a destination Using Transmission Control Protocol (TCP) in which receipt of at least some of the packets from the source at a destination is acknowledged by the destination to the source; and
    a mechanism configured to retransmit packets within a subpath of the network path and to manage acknowledgments of the retransmission of the packets within the subpath independent of the acknowledging by the destination to the source with respect to the transmitting of the unite over the network path.

15. The apparatus of claim 14 in which the network path includes an upper TCP layer.

16. The apparatus of claim 14 in which the subpath includes a base TCP layer.

17. The apparatus of claim 14 in which the subpath extends between two gateway devices.

18. The apparatus of claim 14 in which the subpath extends between a gateway device and the destination.

19. The apparatus of claim 14 further comprising a storage mechanism accessible by the mechanism and configured to store a packet sent by the source to the destination for retransmission until the mechanism receives an acknowledgment that the destination has received the packet.

20. A system comprising:
    a first storage mechanism at a first side of a Transmission Control Protocol (TCP) network path configured to store packets sent from a source to a destination at a second side of the TCP network path;
    a second storage mechanism at the first side configured to store acknowledgments of received packets sent from the second side; and
    a mechanism configured to transmit packets stored in the first storage mechanism to the second side based on duplicity of acknowledgments included in the second storage mechanism.

21. The system of claim 20 in which the TCP network path includes a base TCP layer.

22. The system of claim 20 in which the source is configured to transmit packets to the destination on a network path including the TCP network path.

23. A method comprising:
    transmitting interrelated units of information over a network path from a source to a destination using a protocol in which receipt of at least some of the units from the source at a destination is acknowledged by the destination to the source,
    the transmitting including a retransmission of the units within a subpath of the network path; and
    managing acknowledgments of the retransmission of the units within the subpath by a mechanism that is independent of the acknowledging by the destination to the source with respect to the transmitting of the units over the network path.

24. The method of claim 23 in which the network path includes an upper layer of a Transmission Control Protocol.

25. The method of claim 23 in which the subpath includes a base layer of a Transmission Control Protocol.

26. The method of claim 23 in which the protocol includes a Transmission Control Protocol.

27. The method of claim 23 in which the subpath extends between a gateway device and the source.

28. The method of claim 23 in which the subpath extends between a gateway device and the destination.

29. The method of claim 23 in which managing acknowledgments includes storing at the subpath a packet sent by the source to the destination for retransmission until the subpath receives an acknowledgment that the destination has received the packet.

* * * * *